Oct. 9, 1962 E. G. PRELL, JR 3,057,949
METHOD OF MAKING A BATTERY
Filed Aug. 12, 1959

*INVENTORS*
EDWARD G. PRELL, JR.
BY
*ATTORNEY*

United States Patent Office 3,057,949
Patented Oct. 9, 1962

3,057,949
METHOD OF MAKING A BATTERY
Edward G. Prell, Jr., Rocky River, Ohio, assignor to Union Carbide Corporation, a corporation of New York
Filed Aug. 12, 1959, Ser. No. 833,286
4 Claims. (Cl. 136—175)

This invention relates to batteries of wafer cells. It more particularly relates to a novel method of making such batteries.

Wafer cells are those cells, usually of the primary galvanic type, wherein the thickness thereof is extremely small in comparison to the crosswise dimensions of the cell. Cells of this type may develop low currents because of their small size but are often characterized by high potential per unit volume. Usually, these cells fall into three classes: the solid electrolyte (ionic conductor) cell; the Leclanche wafer cells; and other thin dry cells. Batteries comprising a stack of such cells must be absolutely sealed against the atmosphere. This is necessary, in the case of the solid electrolyte cells in order to inhibit or prevent the ingress of moisture or oxygen, and in the case of the Leclanche and other wafer cells, to inhibit or prevent the egress of moisture. Throughout this specification and the claims appended thereto, the term "wafer cell" will be used to encompass all cells of the types above specified.

Presently, batteries of wafer cells are packaged in plastic or glass tubes which are sealed with wax, asphalt, or plastic material. It is necessary that the container used for packaging these batteries be mechanically strong and yet possess a high volume resistivity. This latter term, the volume resistivity, is the ratio of the potential gradient parallel to the direction of current flow, to the current density. It has been found that some solid electrolyte batteries, for example those which produce extremely small currents, must be packaged in a material having a high volume resistivity. This value should be greater $1 \times 10^{12}$ ohm-cm. for 100 volt batteries, $5 \times 10^{11}$ ohm-cm. for 50 volt batteries, and $1 \times 10^{14}$ ohm-cm. for 1000 volt batteries when such are to operate or be stored at about 95% humidity or higher. Conventional packaging materials suffer from the fault that either they have inadequate mechanical strength or their volume resistivity is too low. It is to be noted in connection with this discussion that volume resistivity values reported in the literature are usually given at about 50% humidity. This may sometimes be misleading because the volume resistivity of many materials, notably plastics, decreases rapidly with an increase in humidity to near the saturation point. Glass has been found to be unsatisfactory despite its high volume resistivity because of its inherent fragility and because there is some surface leakage present when using this material.

It is the principal object of this invention to provide a novel method of making a battery of wafer cells which is packaged in a material having a high volume resistivity, good mechanical strength, and very high leakage resistance.

It is another object to provide a novel method of making an end seal for such a battery which will maintain the cells of the battery in compression.

It is a further object to provide a novel method of making an end seal for such a battery which will act as a contact plate for the battery.

Other objects and advantages of this invention will be apparent from the following detailed discussion having reference to the accompanying drawing in which.

In its preferred form, a battery made in accordance with the invention comprises a stack of wafer cells sealed in a tubular container. In order to provide good mechanical strength as well as high volume resistivity, a bi-element container is used which comprises a metal outer tube lined with a high volume resistivity material. While it is preferred in the practice of this invention to use a high volume resistivity material, a material having a lower volume resistivity may be used for this purpose provided the end of the container is well insulated, as with glass, from contact with this material. The end seal for the battery comprises a conductive sealing plate embedded within the high volume resistivity lining. This end seal is in physical and electrical contact with the battery of wafer cells, but is insulated from the outer metal tube. In utilizing a construction such as described herein, it may be desirable to place an end seal on each end of the stack of wafer cells. It is also within the scope of this invention to form the outer metal tube with a bottom, so as to form an elongated cup for instance, and not line this bottom portion with high volume resistivity material so that it may act as one terminal of the battery. In this situation, only one end seal as described above would be necessary.

The high volume resistivity material may be applied to the interior of a metal tube intended to form the container by any conventional procedure, such as by spraying for example. A stack of wafer cells is then placed inside the lined tube. A sealing plate, which is initially slightly dome shaped, is placed on top of the cell stack so that a small area is left between the sealing plate and the lining. Pressure is applied to the cell stack through this opening until the proper degree of physical contact is achieved between the cells whereupon pressure is then applied to the dome of the sealing plate. The pressure on the dome tends to flatten out the sealing plate forcing the periphery thereof into the lining. The end plate should be made out of workable material so that as it is deformed and flattened by the pressure, it will retain this shape and become securely locked into the lining. It is important that the dimensions of the end plate should be chosen so that upon flattening it will penetrate only partially into the lining. The unpenetrated lining then acts as insulation between the end plate and the outer metal tube. If desired, an electrical lead or other suitable terminal means may be fixed to the end plate by suitable methods, such as soldering or plastic potting for example.

Figure 1:
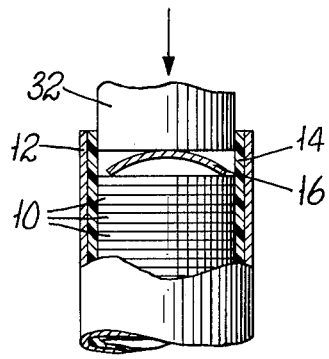
FIG. 1 is an elevation partially in section of a stack of wafer cells prior to being sealed according to this invention, part of the stack being broken away.
Figure 2:
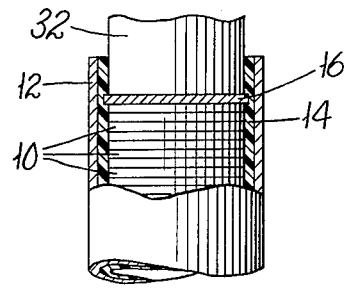
FIG. 2 is an elevation partially in section of a stack of wafer cells similar to FIG. 1 with the sealing plate being embedded into the peripheral container wall.

The method of this invention may be considered with reference to FIGS. 1 and 2 which graphically illustrate incorporating an end seal into a battery container. After a stack of wafer cells 10 has been suitably compressed within a peripheral container, which comprises an outer tube 12 lined with a high volume resistivity material 14, a dome-shaped end plate 16 is positioned on top of the cell stack. Deforming pressure is applied by a piston 32 as shown in FIG. 1. This pressure flattens the end plate 16 and also embeds it into the lining 14 as shown in FIG. 2. Because of the workability of the material used to make the end plate 16, it retains its flattened shape and stays locked within the lining 14. It is prevented from contacting the outer tube 12, however, by a portion of the liner.

Figure 3:
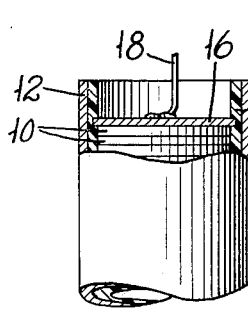
FIG. 3 is an elevation partially in section of a stack of wafer cells sealed according to this invention, part of the stack being broken away.

A completely sealed container is shown in FIG. 3 for a stack of wafer cells 10. This container comprises an outer tube 12 lined with a high volume resistivity material 14 and an end plate 16 locked into the lining material 14. If desired, an electrical lead 18 may be fixed to the end plate 16.

Figure 4:
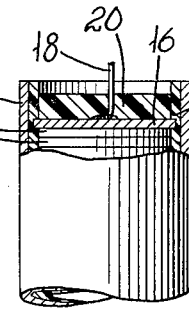
FIG. 4 is similar to FIG. 3 showing a modification of the end seal according to this invention.

A modification of the basic container shown in FIG. 3 is shown in FIG. 4 wherein the end plate 16, outer tube 12 lined with high volume resisitivity material 14, and electrical lead 18 are identical to that shown in FIG. 3. The end seal, however, is made more effective by potting the end plate 16 with a plug 20 of high resistance material. The electrical lead 18 which protrudes through the plug 20 may be soldered or similarly joined to the end plate 16, or it may be retained in position merely by the adhesive reaction of the high resistance plug 20.

Figure 5:
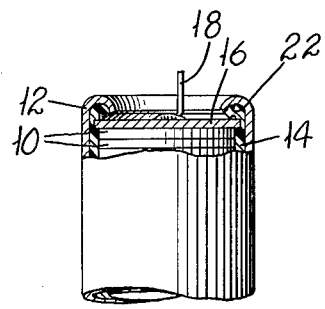
FIG. 5 is similar to FIG. 3 showing another modification of the end seal according to this invention.
Figure 7:
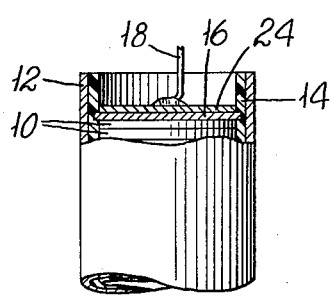
FIG. 7 is similar to FIG. 3 showing a still further modification of the end seal according to this invention.

FIG. 5 shows a construction identical to FIG. 3 with the additional sealing means of crimping the part of the outer tube 12 and liner 14 overlapping the end plate 16 as shown at 22. FIG. 7 also shows a construction identical to FIG. 3 with the addition of a contact plate 24 placed adjacent the end plate 16 and to which the electrical lead 18 is joined.

Figure 6:
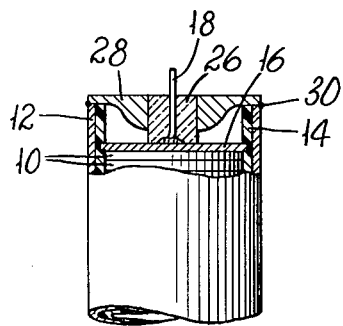
FIG. 6 is similar to FIG. 3 showing a further modification of the end seal according to this invention.

FIG. 6 shows a slightly more elaborate additional sealing means for a battery which is basically identical to that shown in FIG. 3. In this construction, the electrical lead 18 is insulated by and embedded in glass 26 which glass extends from the end plate 16 to a point about equal to the height of the outer tube 12. A metal washer 28 is then adhered to the glass 26 and soldered or in some other way joined to the outer tube 12 as shown at 30. It is important to note that the washer 28 must not be in electrical contact with the end plate 16 if it is electrically connected to the outer tube 12. It will be apparent that many modification of the few constructions set forth herein will suggest themselves to those skilled in the art.

The principal reason for having an outer tube with a liner inside it is because of the difficulty of finding an inexpensive material which is both mechanically strong and has a high volume resisitivity. Because of this, a composite container, such as herein described, is much more feasible. In this type of container, the outer tube is primarily for mechanical strength. A great variety of materials are adapted to use as the outer tube. Among the most promising of these are: brass; steel, both ordinary and stainless; aluminum; rigid plastics; and tempered glass. The purpose of the lining is to insure negligible electrical or other types of leakage. With this requirement in view, this material must be one which has high volume resistivity, high dielectric strength, low wetability and low water absorption. As with the outer tube, many materials satisfy these requirements, for example, polytetrafluoroethylene, polychlorotrifluoroethylene, polyesters, polyamides, polyethylenes, polypropylenes, and epoxides. The end seal should be made of a material which is permanently distortable by relatively low pressure. It should also be electrically conductive and be strong enough to cut into the lining material. Good results have been obtained in the practice of this invention using materials such as half-hard cartridge brass, bronze, aluminum and some steels which have physical properties similar to those of cartridge brass. It is important in choosing the appropriate materials for use in the practice of this invention, that compatible materials be selected. That is, the lining material should be compatible with both the end sealing material and the outer tube material. However, these latter two materials need not be compatible since they are not in contact with each other. Other materials are useful in the practice of this invention and particularly in the modifications described above. The high resistance plug as shown in FIG. 4 may be made of epoxides, polyesters, urethanes, or other materials such as those described as adequate to be used for the lining, both in the solid and foam states. The contact plate as shown in FIG. 7 and the washer as shown in FIG. 6 may be made of any of a number of materials, for example stainless steel. Ordinarily, this washer is available in the open market as an insulated washer unit.

The following may be cited as a specific example of the practice of this invention.

An outer tube was made of brass 0.375 inch in outside diameter with a wall thickness of 0.02 inch. This tube was lined with a 0.02 inch thick layer of polytetrafluoroethylene to give a peripheral container 0.294 inch in inside diameter. A stack of 50 silver/silver iodide/vanadium pentoxide solid electrolyte type wafer cells was placed in this container and sealed at the top and bottom respectively with a domed brass sealing plate initially 0.285 inch in diameter and 0.01 inch thick. After pressure deformation, to flatten the dome and spread the plate, the diameter was 0.305 inch, therefore leaving about 0.015 inch of lining as insulation between the sealing plate and the outer tube. The battery was closed by crimping the container walls. The battery herein described produced 21 volts open circuit voltage upon assembly. It was then stored at 90% to 95% relative humidity at 78° F. After more than 4 months of such storage, with frequent open circuit voltage measurement, the battery was found to have retained very close to its original potential value.

Table I below is a comparison of the open circuit voltage (O.C.V.) after various lengths of time for an average of three batteries made according to the procedure stated in the above specific example. The tests were conducted by storing the batteries tested at 90% to 95% relative humidity at 78° F.

TABLE I

| No. of days | 1 | 4 | 6 | 11 | 29 | 60 | 87 | 91 | 133 |
|---|---|---|---|---|---|---|---|---|---|
| Percent of O.C.V | 100 | 100 | 100 | 100 | 100 | 100 | 100 | 100 | 99.5 |

Table II below gives data obtained by testing the open circuit voltage of conventionally packaged batteries whose cells were identical to those used for testing in Table I. These batteries were contained in glass filled epoxy tubes which had epoxy end potting and epoxy overlocking disks but had no metal outer tube. Because these batteries could not withstand the high relative humidity conditions of the above discussed test the data for Table II was obtained at only 50% humidity at a temperature of 70° F. The results reported are an average of three batteries tested. It is to be understood however that values approximating those cited in Table I would result if the glass filled epoxy tube is used as an inner liner with a metal outer tube.

TABLE II

| No. of days | 0 | 5 | 15 | 25 | 35 | 94 |
|---|---|---|---|---|---|---|
| Percent of O.C.V | 100 | 100 | 97.9 | 95.8 | 93.7 | 90.6 |

Table III below shows the results of tests run on batteries identical to those used to obtain the data for Table I except that they were housed in presently available, standard production containers which consist of formica or epoxy tubing closed with a locking disc. These tests were carried out at 90% to 95% relative humidity at 78° F. and the results reported are the average of these batteries tested. It is to be noted that the time interval in this table is hours, in contrast to days in Tables I and II.

TABLE III

| No. of Hours | 0 | 1 | 19 | 27 |
|---|---|---|---|---|
| Percent of O.C.V | 100 | 97.6 | 76.5 | 58.9 |

An analysis of the data presented above in tabular form reveals that batteries made according to this invention are far superior to those made by conventional procedures in standard containers. This superiority shows up most noticeably in the shelf life of the batteries as determined by testing open circuit voltage after a period of storage. This superiority is overwhelming where these batteries are stored under high humidity conditions which are generally very destructive to these type batteries.

What is claimed is:

1. A method of making a battery of wafer cells which comprises providing a peripheral container for said cells comprising a tube composed of a material having a high volume resistivity, good mechanical strength and low surface leakage; stacking a multiplicity of said cells into said tube, leaving a portion thereof at one end extending beyond the stack of cells; placing into the extended portion of said tube a dome-shaped metal disc member having a diameter such that said disc member, when in the dome shape, will fit within said tube, and when flattened out, will have a diameter greater than the internal diameter of said tube; and compressing said dome-shaped disc member into a relatively flat configuration, whereby to extend the peripheral edges of the flattened disc member into embedding relation in said tube and to lock said flattened disc member into said tube at said end thereof.

2. A method in accord with claim 1 including the step of providing a container comprising a rigid tube having an inner lining composed of a material having a high volume resistivity.

3. A method in accord with claim 1 including the steps of placing said dome-shaped disc member onto said stack of cells, and compressing said disc member into both physical and electrical contact with said stack of cells.

4. A method in accord with claim 1 including the step of crimping over said extended portion of said tube onto said flattened disc member.

References Cited in the file of this patent

UNITED STATES PATENTS

| | | |
|---|---|---|
| 2,144,574 | MacCallum | Jan. 17, 1939 |
| 2,463,565 | Ruben | Mar. 8, 1949 |
| 2,526,692 | Ruben | Oct. 24, 1950 |
| 2,536,699 | Ruben | Jan. 2, 1951 |
| 2,865,976 | Jammet | Dec. 23, 1958 |
| 2,968,687 | Hutt et al. | Jan. 17, 1961 |

FOREIGN PATENTS

| | | |
|---|---|---|
| 497,811 | Belgium | Dec. 16, 1950 |

OTHER REFERENCES

Schmidt et al.: "Principles of High-Polymer Theory and Practice." McGraw Hill (1948), N.Y.C. (page 117 relied on).

UNITED STATES PATENT OFFICE
CERTIFICATE OF CORRECTION

Patent No. 3,057,949             October 9, 1962

Edward G. Prell, Jr.

It is hereby certified that error appears in the above numbered patent requiring correction and that the said Letters Patent should read as corrected below.

Column 1, line 38, after "greater" insert -- than --; column 3, line 39, for "modification" read -- modifications --.

Signed and sealed this 26th day of March 1963.

(SEAL)
Attest:

ESTON G. JOHNSON
Attesting Officer

DAVID L. LADD
Commissioner of Patents